(12) United States Patent
Bennett, Jr.

(10) Patent No.: US 8,792,913 B2
(45) Date of Patent: *Jul. 29, 2014

(54) METHOD AND SYSTEM FOR PROVIDING ASSISTANCE RESOURCE PROGRESS INFORMATION ALONG A ROUTE

(75) Inventor: Richard E. Bennett, Jr., Buford, GA (US)

(73) Assignee: HTI IP, L.L.C., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,327

(22) Filed: Jun. 20, 2012

(65) Prior Publication Data

US 2012/0258737 A1 Oct. 11, 2012

Related U.S. Application Data

(63) Continuation of application No. 12/630,732, filed on Dec. 3, 2009, now Pat. No. 8,229,462.

(60) Provisional application No. 61/119,547, filed on Dec. 3, 2008.

(51) Int. Cl.
*H04W 24/00* (2009.01)

(52) U.S. Cl.
USPC .......... 455/456.3; 455/456.1; 455/456.2; 340/989; 701/29.1; 701/32.3

(58) Field of Classification Search
USPC .......... 415/456.1, 456.2, 456.3, 456.4, 456.5, 415/456.6, 457, 414.1, 414.2, 414.3, 414.4; 701/1, 24, 28, 206, 207, 208, 209, 211, 701/212, 213, 300; 340/989, 990, 991, 992, 340/993, 994, 995.1, 995.11, 995.12, 340/995.15, 995.17, 995.19, 539.13, 340/539.14, 539.16, 539.17, 539.2, 539.23; 455/456.1, 456.2, 456.3, 456.4, 456.5, 455/456.6, 457, 414.1, 414.2, 414.3, 414.4
See application file for complete search history.

(56) References Cited

U.S. PATENT DOCUMENTS

| | | | |
|---|---|---|---|
| 6,512,465 B2 | 1/2003 | Flick | |
| 6,756,913 B1 | 6/2004 | Ayed | |
| 2002/0057212 A1 | 5/2002 | Hamilton et al. | |
| 2002/0115453 A1* | 8/2002 | Poulin et al. ................. | 455/456 |
| 2004/0267410 A1* | 12/2004 | Duri et al. ......................... | 701/1 |
| 2005/0136942 A1* | 6/2005 | Timiri et al. ............... | 455/456.1 |
| 2006/0217885 A1 | 9/2006 | Crady et al. | |
| 2007/0100519 A1 | 5/2007 | Engel | |
| 2007/0135979 A1 | 6/2007 | Plante | |
| 2007/0197231 A1* | 8/2007 | Lin ............................ | 455/456.1 |
| 2008/0299989 A1* | 12/2008 | King et al. ................. | 455/456.1 |
| 2009/0055091 A1 | 2/2009 | Hines et al. | |

\* cited by examiner

*Primary Examiner* — Kent Chang
*Assistant Examiner* — Gerald Oliver

(57) ABSTRACT

A user, either in a vehicle with a telematics device, at a home having a computer device, using a handheld wireless device, or other type of communication device, can request services such as to repair a flat tire, unlock a locked door, repair cable television service, etc. using the communication device. The user's communication device sends a request message over the communication network to a second server. The second server creates a request for service record and forwards the message to a first server that determines a resource to dispatch to the user's location. The first server sends resource information, including location information, to the user's device, and either the device, or a device coupled to the user's communication device, displays the current location of the service resource on a map as the resource makes its way toward the user's location.

11 Claims, 4 Drawing Sheets

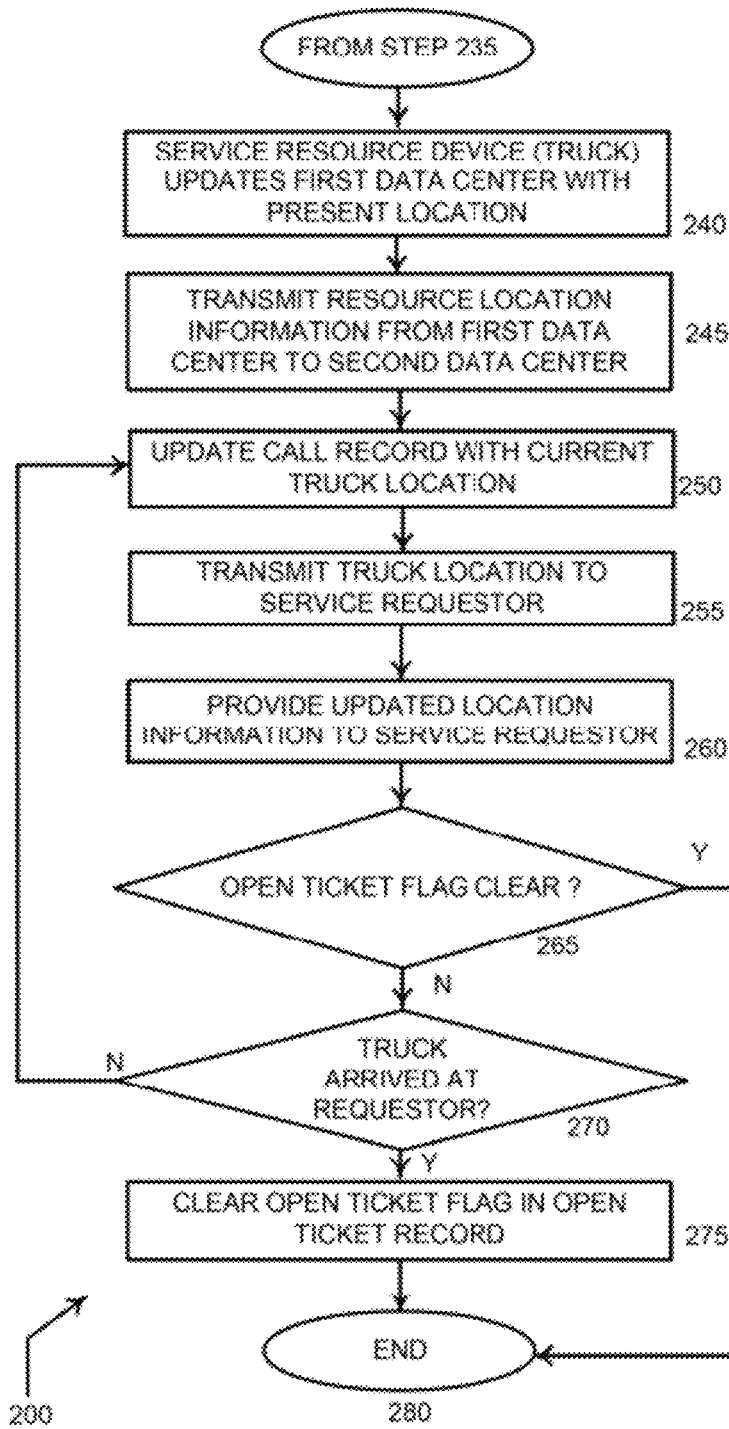

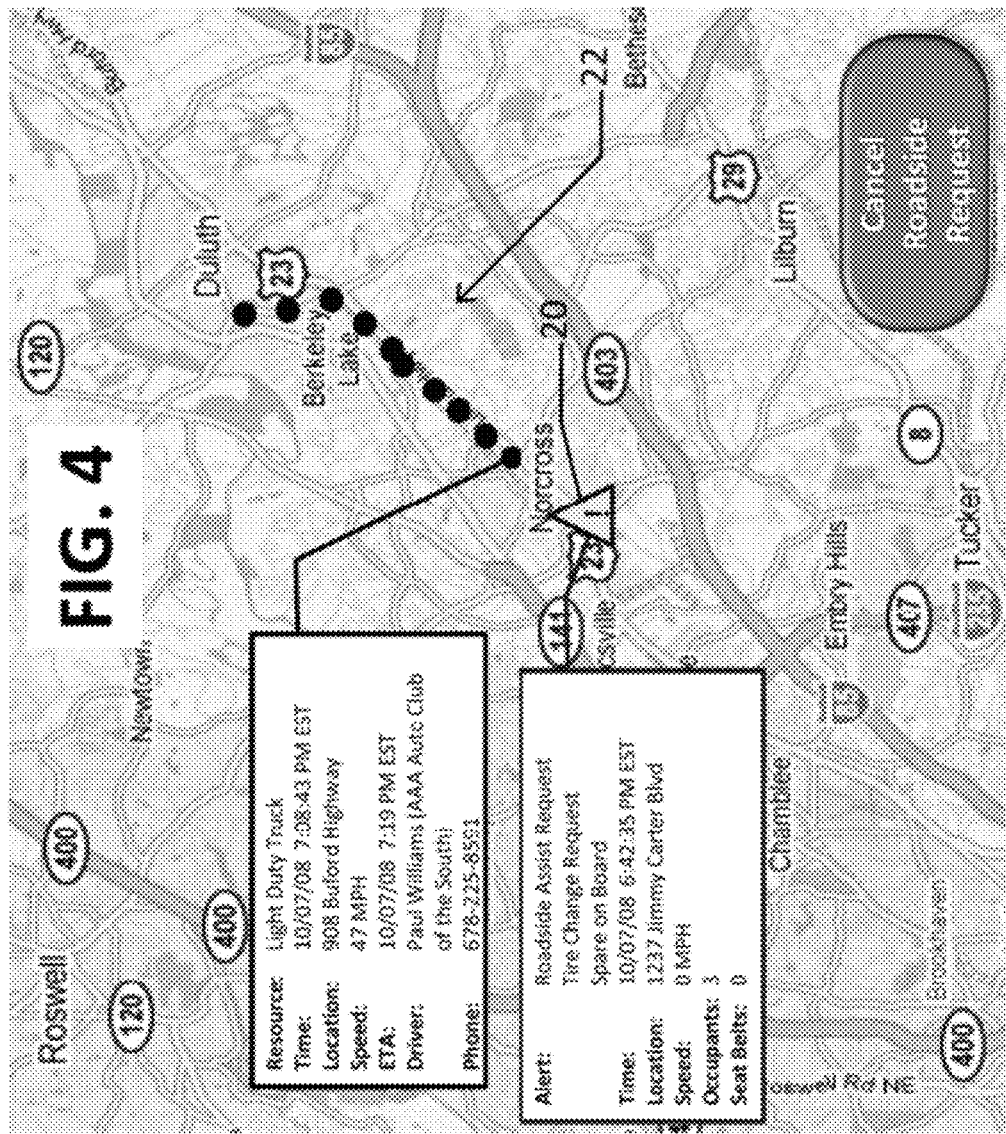

METHOD AND SYSTEM FOR PROVIDING ASSISTANCE RESOURCE PROGRESS INFORMATION ALONG A ROUTE

CROSS REFERENCE TO RELATED APPLICATION

The present application is a continuation of, and claims priority under 35 U.S.C. §120 to, U.S. patent application Ser. No. 12/630,732, filed on Dec. 3, 2009, entitled "Method and system for providing assistance resource progress information along a route," now U.S. Pat. No. 8,229,462 which claims priority under 35 U.S.C. §119(e) to U.S. Provisional Patent Application No. 61/119,547 filed on Dec. 3, 2008, by Bennett, entitled "Method and system for providing assistance resource progress information along a route," both of which the present application incorporates by reference in their entireties.

TECHNICAL FIELD

The claimed subject matter relates to telematics devices, and more particularly, to providing real time information regarding the location of service provider personnel while in route to rendering assistance to a user.

BACKGROUND

Many providers offer services to consumers and commercial customers of services ("users"), such as telematics services, including, roadside assistance, emergency accident response or door unlock; home repair services, such as, for example, cable television technical work, appliance repair or delivery of an item. When a user requests a particular service of the provider, the user may contact the service provider repeatedly asking when the technician, emergency worker, or other appropriate personnel, will arrive at the user's location, or the location the user requested that the service personnel perform the requested service.

Even though a service provider central dispatcher may have dispatched personnel immediately after receiving a request for service, a user's understandable, but repeated, instances of contacting the provider can cost the provider because he, or she, needs to have more call-answering personnel available to handle a user's calls and calls from other users too. In addition, the repeated calls asking when the actual personnel will arrive at the desired location disrupt a provider's call center operation, and may cause a reduction in service quality to other callers who also need assistance.

Although the repeated calls to a provider's call center increases costs, which a provider typically passes on to the subscriber of the services, a user has a legitimate and understandable interest in knowing when to expect that emergency personnel may arrive on the scene of an accident, for example. Even in a nonemergency situation, knowing precisely when a cable television company's technician will arrive at the user's house can allow the user to spend time on a productive activity rather than wait for the technician to arrive "sometime within a four hour window," which is typical for service providers that have to roll a truck to a user's location in a nonemergency situation.

Thus, the art needs a method and system for providing real-time information to a user of the progress of service provider personnel as they make their way from an initial location to the user's location.

In addition, service providers who deliver services to a mobile consumer, including roadside assistance, emergency accident response or door unlock, frequently arrive at the specified customer location only to discover the customer is not at the specified location. The service provider will spend time and resources searching for the customer, and consume additional call-answering resources determining a more accurate location. Frequently the customer cannot be located because they have satisfied the service need and left the specified location.

Thus, the art needs a method and system for providing real-time information to a service provider of the mobile consumer's location.

DECRYPTION OF THE DRAWINGS

FIG. 3 illustrates a flow diagram continuation of a method for providing route progress to a user of a requested service.

FIG. 4 illustrates a screen shot of a device displaying progress of service personnel along a route shown on a map.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such to other embodiments, adaptations, variations, modifications and equivalent arrangements, the present invention being limited only by the claims appended hereto and the equivalents thereof.

Figure 1:
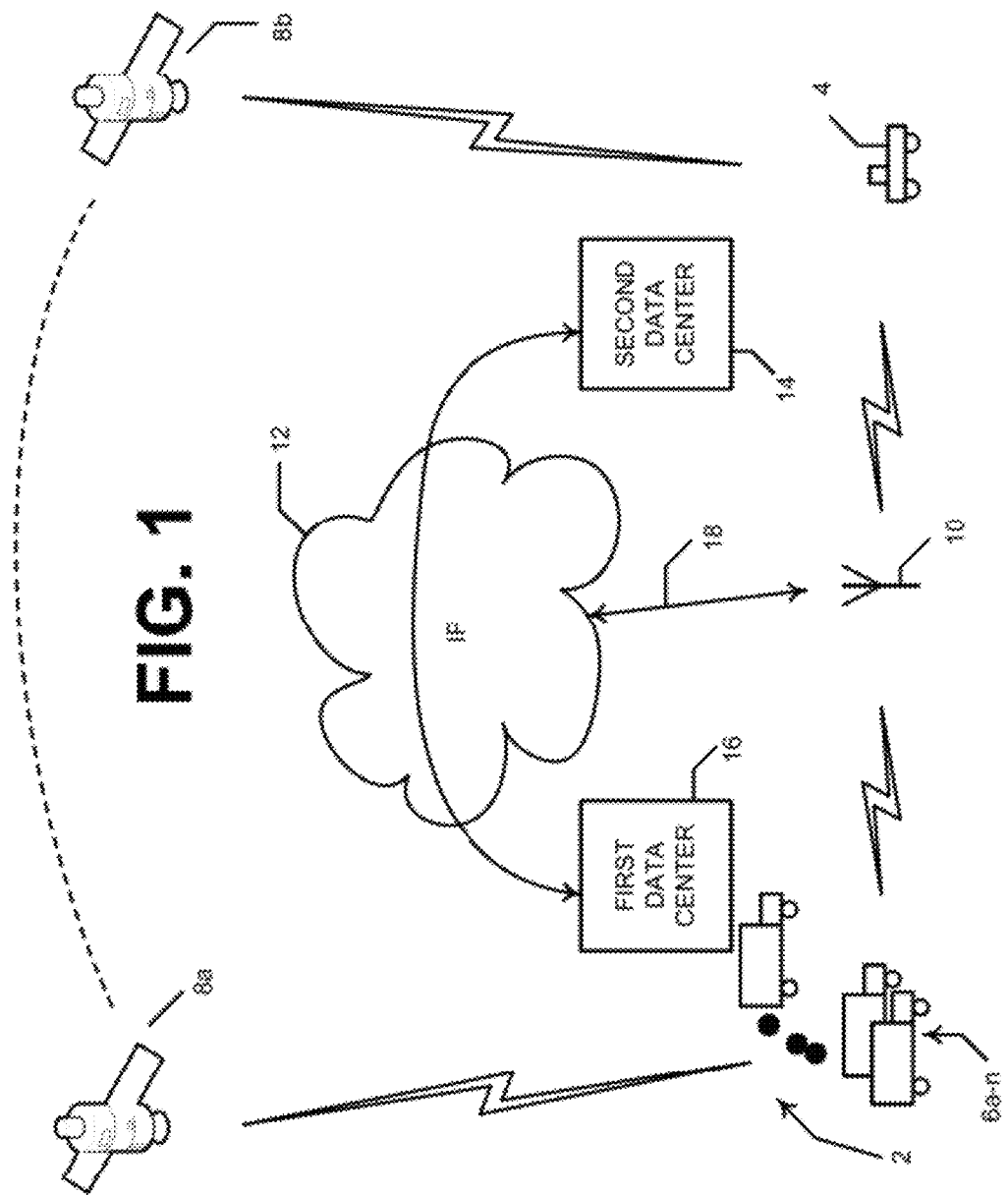
FIG. 1 illustrates a network diagram of a system for providing route progress to a user of a requested service.

Turning now to the figures, FIG. 1 illustrates a system 2 that facilitates communication to and from a device at a user's vehicle location 4, and to and from a device at a service provider's truck location 6. One skilled in the art will appreciate that user vehicle location 4 may represent any user location, such as a home or office, and not just a mobile resource. In addition, a device at user location 4 may be any electronic communication and computer device that includes GPS circuitry and communication circuitry that can communicate location data, which may include GPS coordinates of the device's current location at any given time. Thus, the device at user location 4 can include a hand held, portable device, such as a GPS enabled cellular telephone.

Regarding provider truck locations 6, the trucks in the figure may represent, and correspond to, one, or more, of a plurality of trucks' locations in a given geographical region when the user requests service from the provider who operates the trucks. The figure shows trucks 6 as representative of GPS enabled communication computer devices that used by provider personnel, since personnel and technicians typically render services in person over a geographical region by travelling in a truck. However, service provider trucks 6a-n could also represent devices of personnel on foot, such as security personnel at an event, or boats, airplanes, bicycles, or possibly specially trained animals with tracking devices, as well as any other means for rendering services to a requesting user.

Often, a user vehicle at location 4 and a provider truck at location 6 each use a telematics unit, sometimes referred to as a vehicle telematics unit ("VTU") or a telematics control unit ("TCU") mounted, or otherwise collocated with the user vehicle, and the provider truck. For purposes of discussion, "TCU" may refer to any mobile device that includes a global positioning satellite ("GPS") receiver and is capable of communications through the cellular network. A TCU unit may use GPS circuitry and algorithms to determine the present location of the TCU, and thus the vehicle, truck, person, animal, etc. to which it corresponds. Alternatively, a TCU may periodically, or sporadically, transmit its current GPS coordinates to a central server which may determine the users location relative to another location, and generate a map that displays the locations of the user and the other location of the map.

GPS technology typically uses multiple satellites, represented by 8a and 8b, above earth to communicate time stamped messages with the GPS device in a TCU. Based on the receive time of the messages, the GPS device in the TCU can calculate its location relative to a reference, such as the widely used latitude and longitude coordinates familiar to those in the navigation arts. One skilled in the art will understand that although satellite 8a appears to point toward trucks 6a-n, and satellite 8b appears in the figure to point toward user location 4, both satellites, as well as at least two others (and perhaps up to nine) typically would be within view of both the trucks and the user location. Both the trucks 6a-n and a device at user location 4 would typically use signals transmitted from all four, or more, satellites, to determine the location of the trucks or the device at the user location.

In addition to a user in user vehicle 4, or other user location, waiting on service personnel to arrive at the user location, a user remote from location 4 may also track the progress of service personnel with a personal computer using location information of user location 4, such as, for example, a known street address, or GPS coordinate values, via the Internet.

A TCU also typically uses a cellular telephony circuit and algorithms, or wireless technology, to communicate via a network of antennas, represented by antenna 10. Network, or antenna, 10 couples to network 12, which may be a single internet protocol network, a collection of networks themselves coupled to one another, each possibly using different communication protocols and communication technologies. Thus, a TCU in vehicle 4 may be associated with a telematics service provider's data center 14, and a TCU in different service provider's truck 6 may be associated with another data center 16. For purposes of discussion, this application will refer to data center 14 as 'second data center' and will refer to data center 16 as 'first data center.'

A data center typically includes equipment for processing and interfacing with communications traffic to and from user devices, including voice traffic and data traffic. Often, traffic from a device may include voice and data traffic packets, with the packets from the different streams linked together by an identifier of the device. Antenna network 10 typically couples to network 12 via communication link 18, which may be a wire link, a microwave link, or another type of communication link known in the art.

Figure 2:
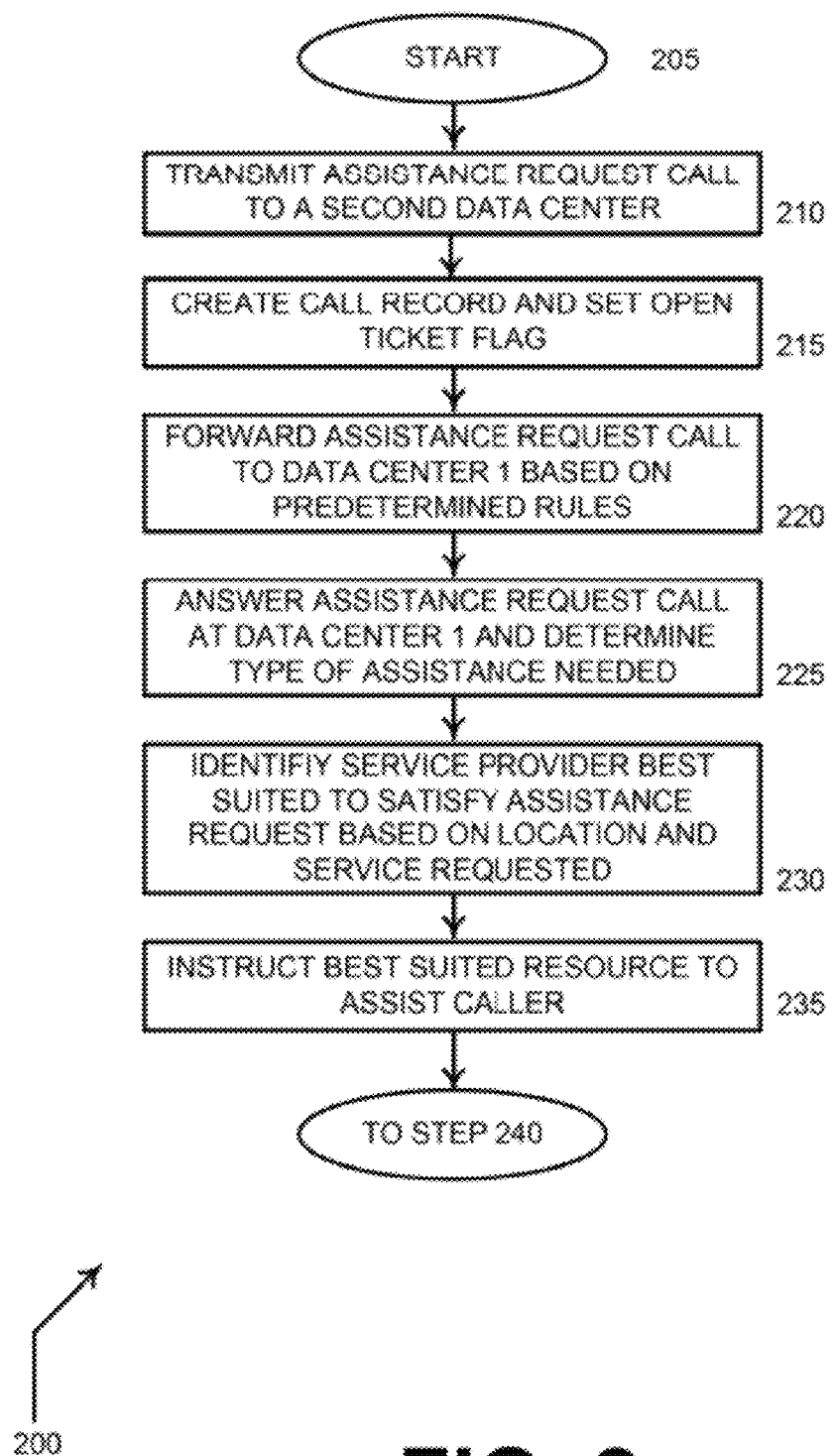
FIG. 2 illustrates a flow diagram of a method for providing route progress to a user of a requested service.

Turning now to FIG. 2, the figure illustrates a flow diagram of a method 200 for providing route progress of personnel along a route to render services to a user. A user starts method at step 205 and at step 210 transmits an assistance call with a user device. The call may include a voice call, a SMS request message, and e-mail message, or other such message for communicating a request electronically. A call center associated with the user's subscription receives the call. The call may be made using a TCU in to a vehicle, from a cellular telephone coupled with a GPS device, or other means that a user can use to request services from a provider, and that can transmit geographic location information of the device to the service provider in the request for assistance message, or concurrently with a call for assistance.

A typical scenario includes a user using a TCU in a vehicle to notify a call center of an accident, flat tire, out of fuel condition, or key lock-out situation. A user might also use method 200 to request service at a stationary location, such as utility service, or appliance repair service, at a home or office. The user may manually initiate the notification and request for assistance, or the occurrence of a given condition, situation, or accident, or some other predetermined even, may serve as a trigger that automatically initiates notification and request for services.

For purposes of discussion, this application refers to a data center that corresponds to a user device as a second data center. Typically, a user subscribes to services from a provider that provides mobile communication connectivity, to a network such as the internet, and also can connect the user via a voice or data connection to live call center personnel. The location of the call center personnel and data center may, or may not be, collocated. A data center typically includes computer servers and networking equipment that couples the computer server equipment with a network, such as an internet protocol ("IP") network.

When a user places a services request call at step 210, live call personnel at the call center may manually create a call record of the request for assistance call, or automated equipment may acknowledge to the user that the data center, and possibly the call center too, received the call and create a call record. The record will typically include an 'open ticket' field, or flag, which indicates that the action item associated with the request corresponding to the call record has not been completed. When the record is created at step 215, the equipment at the data center sets the flag to indicate that the action requested has not been completed. The call record, including the open item flag, are typically generated at and stored on a computer server at the second data center typically operated by a consumer telematics operator.

Regardless of how the call record has been created, a determination is made how to handle and process the call and data associated with it. A computer, or personnel, at the call center, or at the second data center, can determine how to forward the call according to predetermined rules. For example, if the call requests emergency services, a live operator may keep the caller 'on the line' until a ambulance, police patrol, wrecker truck, etc. has been dispatched and the call center personnel believes that releasing the caller from the live call will not imperil the caller. Alternatively, if the caller has called because they ran out of fuel, have a flat tire, locked their keys out of their car, etc., a computer at the call center, or second data center, may automatically receive the call, and forward it to a first server at step 220 without any human intervention from a live operator.

When a call, or assistance request, is sent from a requestor, or user of a device at location 4 referenced in FIG. 1, it may include an 'assistance type' indication included in a data message, or in data that the user device sends along with the voice message. The assistance type indication may indicate that the corresponding call contains a request for a non-emergency and may further indicate that a tow truck is needed. In addition to the assistance type indication, a TCU typically sends other information in a data to stream, including location coordinates, speed, RPM, fuel level, air bag deployment status, recent brake usage history, acceleration values, among other information.

Thus, if a call center, or other type of data center, receives a call for a tow truck, while an operator at the call center associated with the second data center communicates with the caller verbally, data processing equipment and applications at the second data center can automatically transfer at step 220 the call, or information contained in the call, or request, to a first data center associated with an operator of a tow truck fleet, for example.

The second data center, associated with the user's telematics services provider, can perform a table lookup in a database that associates services providers with the type of services they provide. For example, an index field of the database may contain data that indicates the type of services a provider listed in another field of a corresponding entry in the database offers. Another field in the corresponding entry may include addresses of the services provider. The addresses may include telephone numbers, internet addresses, or other type of information that facilitates the second data center automatically transmitting the assistance request message to the first data center associated with the services provider, i.e., the tow truck operator, for example. Thus, while the live operator at the second data center communicates with the caller, the tow truck operator can begin the process of routing a tow truck to the caller's location based on a resource (i.e., one of its tow trucks) located the closest to the user location 4.

At step 225, a data center associated with the tow truck operator receives the information sent from the caller and transmitted from the second data center. The information received at step 225 may include only the data portion of the call (including location coordinates, assistance type identifier, etc.), but the first data center can search its records to determine the nearest tow truck to the call at step 230, based on a comparison between coordinates of caller's location 4, as shown in FIG. 1, and periodically updated location coordinates of all the tow trucks in its fleet. In addition, the operator is associated with the caller's telematics services provider may also transfer at step 225 the voice call traffic to operator personnel at a call center associated with the first data center, which would be the call center associated with the tow truck fleet operator in the exemplary scenario described above.

At step 235, the data center associated with the tow truck fleet instructs the truck located nearest to the caller/user and not currently occupied assisting someone else, to begin driving toward the caller. One skilled in the art will appreciate that even if the closest tow truck is currently assisting another, the second closest unoccupied two truck may be so far away from the caller that the closest two truck could still serve the caller sooner than the second closest.

Turning now to FIG. 3, and continuing with description of method 200, the tow truck assigned to provide service to the caller updates the first data center with its current location coordinates at step 240. The first data center transmits the current location coordinates of the tow truck to the second data center at step 245. At step 250, the second data center updates a field in the call record created at step 215 with the updated location coordinates of the tow truck. At step 255, the second data center transmits in a location message the tow truck's current location coordinates to a device at user location 4 shown in FIG. 1. At step 260, the device at user location 4 provides information in the location message to the user, for example by visually displaying a marker showing the location of the service provider personnel (the tow truck) on a map based on its current location coordinates. Other forms of providing the information to the user include providing an audible message reporting the coordinates or time until the truck arrives at user location 4, displaying the coordinates or time until arrival, or providing geographic information related to the coordinates, for example a street address, or intersection, of the truck's location. The information may be transmitted from the second data center to the user's device wirelessly or over a wired communication network.

At step 265, equipment at the second data center determines whether the open ticket flag has cleared. If the open ticket has been cleared, method 200 ends at step 280. If the second data center determines at step 265 that the open ticket flag has not cleared, equipment at the second data center checks to determine whether it has received information that the service provider (tow truck in the exemplary scenario) has arrived at the user's location 4. The second data center can accomplish step 270 by checking to see whether the first data center has received a message affirmatively sent from the service provider truck 6 that it has arrived at the user's location 4. Alternatively, the second data center can compare the last updated location coordinates of the service provider truck 6 with the location coordinates of the user 4. If the two sets of coordinates match, or the first data center informs the second data center that the driver has affirmatively sent information that he, or she, has arrived at the user's location 4, the second data center clears the open ticket flag at step 275, and method 200 ends at step 280. However, if the second data center does not determine at step 270 that the service provider has arrived at the user's location, then method 200 returns to step 250 and continues as described above.

Accordingly, method 200 can provide updated information to the user repeatedly at step 260 as the service provider follows his, or her, route to the user. For example, if a user navigation system in his, or her, vehicle displays a roadmap of the surrounding area, updated markers of the service provider's location can be displayed on the road map every time method 200 executes step 260.

The second data center may also clear the flag at step 275 if it has received a transmission from the user's telematics device indicating that its location has changed based on GPS coordinates. This scenario could occur of the user at location 4 was able to repair his vehicle and drive off. Thus, if the GPS coordinates indicate that that the user device is moving, the second data center, either automatically, or via a voice call, can query the user to confirm that the services provider is no longer needed. If so, the second data center can clear the flag and communicate to the first data center that the tow truck is no longer needed at user location 4.

FIG. 4 illustrates a typical road map display in the user's vehicle navigation device. The user request location triangle 20 indicates the user's, or requestor's, location 4, and the series of location markers 22 indicate the location of the service provider truck 6 as it progresses along a route toward the user, These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A system for providing location information of a service provider resource on its way to a user location, comprising a server at a data center associated with a user device configured for:

receiving a request for assistance message from the user device at the user location, the message including information describing the location of the user device;

processing the request message at the data center associated with the user device to determine a services provider that can provide a type of service corresponding to the request for assistance message;

transmitting the request for assistance message to a data center associated with a provider of services that can provide the type of service requested in the request message, wherein the data center associated with the user device determines the provider of services to transmit the request for assistance message to based on the type of service requested in the request for assistance message;

receiving from the data center associated with the provider of services service resource information related to a service resource assigned by the services provider based on the information describing the location of the user device in response to the transmitted request for assistance message; and transmitting a location message from the data center associated with the user device to the user device indicating the location of the service resource relative to the user device location.

2. The system of claim 1 wherein the data center associated with the user device includes a consumer telematics operation center server.

3. The system of claim 1 wherein the data center associated with the services provider includes a fleet management telematics operation center server.

4. The system of claim 3 wherein the processing, step includes comparing a requested services type indicator contained in the request for assistance message with service provider entries in a database indexed according to a services type field, and determining a services provider to which to transmit the assistance request message to based on data in the services provider's entry that indicates the type of services it offers.

5. The system of claim 4 wherein the assistance request message is transmitted to the services provider referenced in the database entry having the data that matches the requested services type indicator according to an address also referenced in the database entry.

6. The system of claim 4 wherein the data indicating the type of services of a provider referenced in its corresponding entry of the database is meta data.

7. A method for managing a service provider resource on its way to a user location, comprising:

receiving a request for assistance message transmitted from a user device at the user location, the message including information describing the user device;

processing the request for assistance message at a data center associated with the user device to determine a services provider that can provide a type of service corresponding to the request for assistance message;

transmitting the request for assistance message to a data center associated with a provider of services that can provide the type of service requested in the request message, wherein the data center associated with the user device determines the provider of services to transmit the request for assistance message to based on the type of service requested in the request for assistance message;

receiving from the data center associated with the provider of services service resource information related to a service resource assigned by the services provider based on the information describing the location of the user device in response to the transmitted request for assistance message; and transmitting a notification to the data center associated with the provider of services that the service resource is no longer needed in response to the request for assistance message if the data center associated with the user device receives a transmission from the user device that it has moved from the user location from which it transmitted the request for assistance message.

8. The method of claim 7 wherein the data center associated with the user device includes a consumer telematics operation center server.

9. The method of claim 7 wherein the data center associated with the services provider includes a fleet management telematics operation center server.

10. The method of claim 9 wherein the processing step includes comparing a requested services type indicator contained in the request for assistance message with service provider entries in a database indexed according to a services type field, and determining a services provider to which to transmit the assistance request message to based on data in the services provider's entry that indicates the type of services it offers.

11. The method of claim 10 wherein the assistance request message is transmitted to the services provider referenced in the database entry having the data that matches the requested services type indicator according, to an address also referenced in the database entry.

* * * * *